United States Patent [19]

Smith et al.

[11] Patent Number: 5,724,161
[45] Date of Patent: Mar. 3, 1998

[54] HOLOGRAPHIC INFORMATION DISPLAY FOR EXTERIOR VEHICLE APPLICATION

[75] Inventors: Ronald T. Smith, Corna Del Mar, Calif.; Robert Allan Pyburn, Carmel, Ind.

[73] Assignees: Delco Electronics Corp., Kokomo, Ind.; Hughes Electronics Corp., Los Angeles, Calif.

[21] Appl. No.: 537,176

[22] Filed: Sep. 29, 1995

[51] Int. Cl.$^6$ ..................................... G03H 1/00
[52] U.S. Cl. .................. 359/13; 359/22; 359/24; 359/32; 359/34; 40/547
[58] Field of Search ..................... 359/1, 13, 14, 359/15, 32, 34, 22, 24; 40/596, 124.1, 616, 541, 547

[56] References Cited

U.S. PATENT DOCUMENTS

| | | | |
|---|---|---|---|
| 4,730,881 | 3/1988 | Taguchi et al. | 340/438 |
| 4,818,048 | 4/1989 | Moss | 345/7 |
| 4,893,887 | 1/1990 | Coates | 359/1 |
| 5,142,384 | 8/1992 | Wood et al. | 359/3 |
| 5,223,357 | 6/1993 | Lovison | 430/1 |
| 5,341,230 | 8/1994 | Smith | 359/13 |
| 5,571,277 | 11/1996 | Allred et al. | 362/61 |

*Primary Examiner*—Paul M. Dzierzynski
*Assistant Examiner*—Darren E. Schuberg
*Attorney, Agent, or Firm*—Jimmy L. Funke

[57] ABSTRACT

Apparatus comprising a decal disposed on an interior surface of a window and a light source for projecting light onto the to display an image outside of the vehicle. The decal comprises a protective layer having a hologram layer disposed thereon that is designed to transmit a holographic image in a predetermined viewing direction. An opaque and clear mask layer into which an icon is incorporated may be secured to the hologram layer to provide a two-dimensional image. The hologram layer is illuminated by sunlight, skylight, or a light source and projects an image to a viewer at a predefined direction. During the day, the icon is viewable because light transmits through the clear portions of the mask layer is clear, and is blocked by opaque portions of the mask layer that define the icon. At night, the decal is illuminated by light from a light source 18, or an exterior or ambient light source to produce an image viewable by the observer. The decal may be designed to direct diffracted light to specific areas where viewability is desired, thereby creating images that are brighter to observers than may normally be achieved.

15 Claims, 3 Drawing Sheets

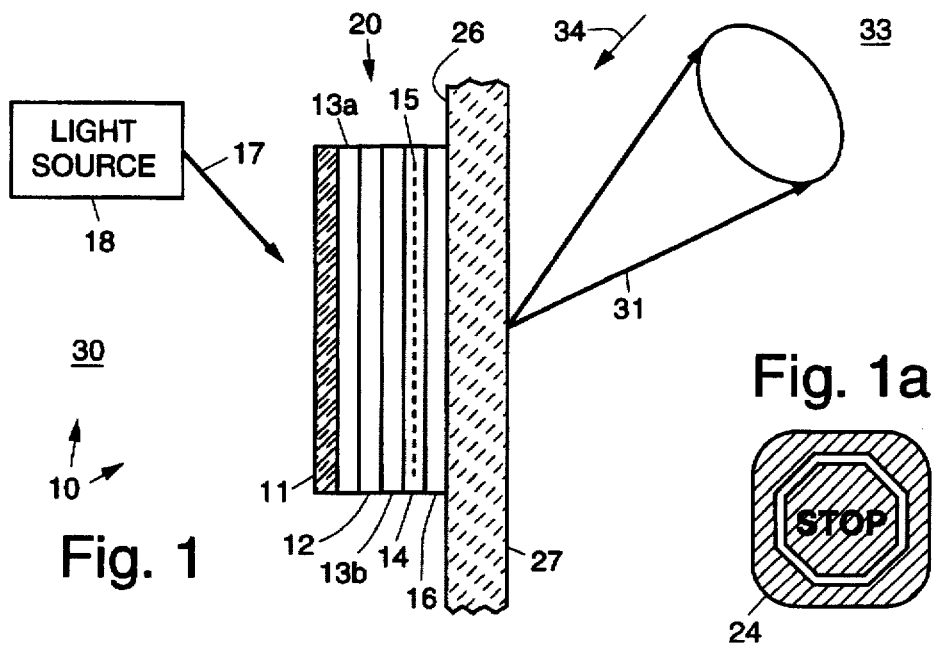
Fig. 1a
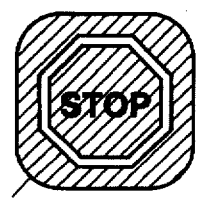
Fig. 1
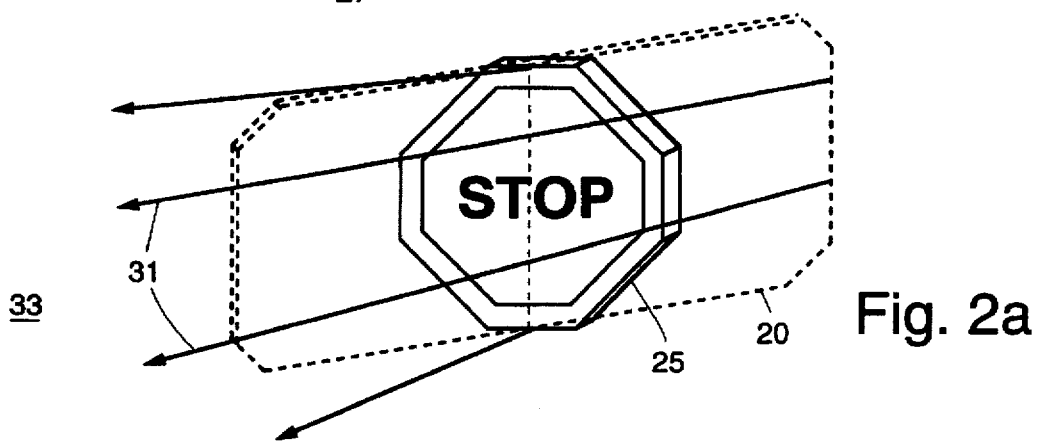
Fig. 2
Fig. 2a
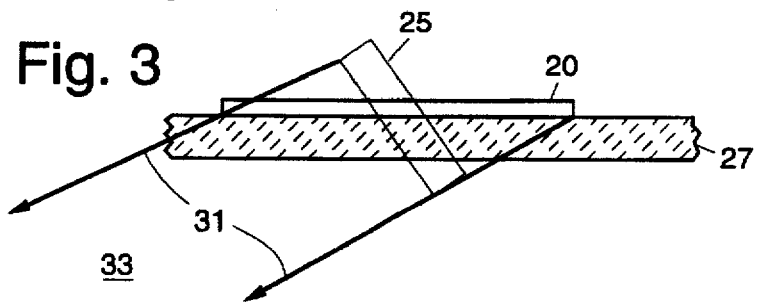
Fig. 3

HOLOGRAPHIC INFORMATION DISPLAY FOR EXTERIOR VEHICLE APPLICATION

BACKGROUND

The present invention relates generally to holographic displays, and more particularly, to holographic apparatus for displaying information to an observer outside of a vehicle under daytime and nighttime lighting conditions.

Presently, information is displayed to an observer outside of a vehicle, for example, by the use of signs, placards or window decals, which are viewable by day when illuminated by natural daylight or other external illumination sources. This display methodology is limited by the availability of illuminating light. In particular it is typically difficult to view such images at nighttime, for example. Furthermore, the signs, placards or window decals are two-dimensional icons that may include text and that have limited viewability from the vehicle exterior due to the manner in which it is mounted. Often, the sign or decal is placed on the window glass of a vehicle, which is not always in an easy to view or read location. In other words, persons who are not directly in front of the sign or decal have a limited view of the icon and/or text of interest because of foreshortening that occurs when one views a two-dimensional image from a direction that not perpendicular to the image. Furthermore, two-dimensional images have a limited ability to capture a viewer's attention in that they do not "jump out" at the observer as would be desired.

Accordingly, it is an objective of the present invention to provide holographic apparatus for displaying information to an observer under daytime and nighttime lighting conditions.

SUMMARY OF THE INVENTION

To meet the above and other objectives, and to solve the above-mentioned shortcomings, the present invention provides for apparatus including a window-mounted holographic decal and a light source that are used to display two-dimensional or three-dimensional images to get an observer's attention. More specifically, the apparatus comprises a holographic decal disposed on an interior surface of a window, such as a window of a vehicle, for example, and a light source for projecting light onto the decal to display a holographic three-dimensional image or two-dimensional image outside of the vehicle or external to the window.

The decal comprises a protective plastic layer, a hologram layer disposed on the protective plastic layer that is designed to transmit or project a holographic image in a predetermined viewing direction, and an adhesive layer. The holographic decal is secured to the interior surface of the window and is illuminated by a light source, such as ambient light from the sun or an interior-mounted light source. The hologram layer is illuminated by sunlight, skylight, or an interior-mounted light source and projects an image to a viewer at a predefined direction. An option is an opaque and clear mask layer into which an icon may be added to the decal to provide a two-dimensional image. During the day, the icon is viewable because ambient light from the interior of the vehicle transmits through the clear portions of the mask layer, and is blocked by the opaque portions of the mask layer that define the icon. At night, the decal is illuminated by light from the light source, or an exterior light source to produce a holographic image viewable by the observer.

The hologram image may be either two-dimensional or three-dimensional. A three-dimensional image of the holographic decal may rotated so that it faces directly at an off-perpendicular observer to avoid the effect of foreshortening. This allows the graphics and image comprising the decal to be more easily viewable from off-perpendicular directions. The decal may be designed to direct diffracted light only to areas where viewability is desired, thereby creating images that are brighter to observers than may be achieved using conventional means. The decal may be illuminated using light emitting diodes (LED's), incandescent bulbs, fiber optic lighting, laser diodes, or other light sources, allowing the graphics or image to be visible during nighttime conditions and/or viewable during the daytime using an exterior ambient source such as the sun or sky. The present invention may be used in non-vehicle applications as a sign for use in advertisements, and the like.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 shows a first embodiment of holographic apparatus in accordance with the present invention for displaying information to persons outside of a vehicle;

FIG. 1a shows a holographic image displayed by the holographic apparatus of FIG. 1;

FIG. 2 shows a second embodiment of holographic apparatus in accordance with the present invention;

FIG. 2a is a perspective view of the hologram decal and a three-dimensional holographic image which bisects the hologram plane;

FIG. 3 is a top view of the holographic apparatus disposed on a window of a vehicle and the projected three-dimensional holographic imaged displayed thereby;

DETAILED DESCRIPTION

Figure 4:
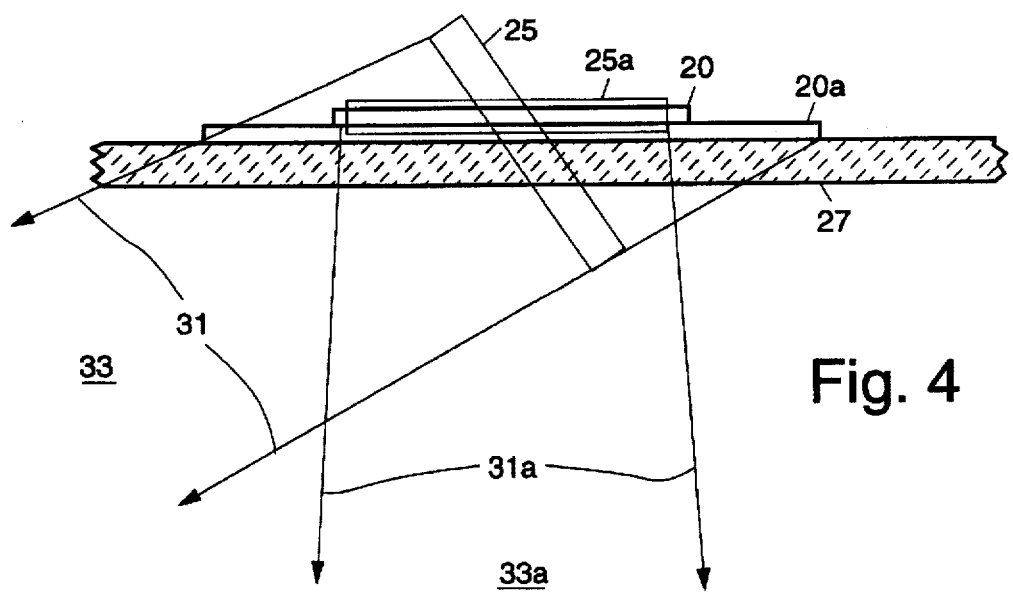
FIG. 4 is a top view of a second embodiment of the present invention employing two different holographic displays.

Typically, notification of the presence of a vehicle or radio security system, for example, is indicated to an observer located outside of a vehicle by means of a conventional decal disposed on window glass. The decal is viewable by day using ambient light. The notification is provided at night using a blinking light emitting diode (LED), for example, that is unrelated to the decal, that is disposed on the vehicle's instrument panel, for example. Typically the LED is disposed on a radio faceplate, which has very limited viewability to those outside of the vehicle. The present invention is designed to overcome these limitations.

Referring to the drawing figures, FIG. 1 shows a greatly enlarged view of a first embodiment of holographic image generation system 10 or holographic apparatus 10 in accordance with the invention. The holographic apparatus 10 may be used to display information to an observer outside of a vehicle 30. A reduced-to-practice embodiment of the holographic apparatus 10 that solves the above-mentioned viewability problem is configured as a decal 20 mounted on a side window 27 of the vehicle 30 and a light source 18 mounted in the interior of the vehicle 30. The decal 20 has a sandwich structure that is comprised of a protective plastic layer 11, a diffuse transmission hologram layer 12 secured to the protective plastic layer 11 by way of a first adhesive layer 13a, an opaque (black) and clear mask layer 14 into which an icon 15 is incorporated secured to the hologram layer 12 by way of a second adhesive layer 13b.

The decal 20 comprises and displays a two-dimensional vehicle or audio system anti-theft (such as Delco Electronics Theftlock™ system) icon image 24, for example, indicating that a radio disposed in the vehicle 30 has an alarm system coupled to it, for example. FIG. 1a shows a typical holographic icon image 24 displayed by the holographic apparatus 10 of FIG. 1. The goal of the icon image 24 is to deter theft of the radio. The decal 20 is applied to an interior surface 26 of the window 27 of the vehicle 30, such as to a quarter window 27 next to a rear passenger seat. The decal 20 is adhered to the interior surface 26 of the window 27 using the adhesive layer 16.

During daytime the anti-theft icon 15 within the decal 20 is viewable because light from the vehicle interior transmits unimpeded through the clear portions of the decal 20 where the mask layer 14 is clear, and is blocked by the black portions of the mask layer 14 that define the icon 15. At night, the decal 20 is illuminated by light 17 from a light source 18, such as a red light emitting diode 18 that blinks with a preset duty cycle or is constantly illuminated, that is mounted adjacent a roof area of the interior of the vehicle 30, for example. The red light from the light emitting diode is diffracted by the transmission hologram layer 12 into the direction of the observer but transmits through the opaque and clear mask layer only where the mask is clear. In this way, light is diffracted by the hologram layer 12 but the image 24 is still defined by the opaque and clear mask layer 14. Therefore, the two-dimensional anti-theft icon image 24 is viewable at night. The image that is seen by an observer is two dimensional regardless of whether the mask layer 14 is illuminated by ambient light during the day or the hologram layer 12 is illuminated by the light source 18 at night.

Since the generated image 24 is displayed on the vehicle window 27, the image 24 is easily viewable by an observer outside the vehicle 30. The hologram layer 12 may be designed to diffract light 31 into a well-defined viewing zone 33, thereby using available light more efficiently and creating an image 24 that is brighter than would be achievable by conventional means. For example, in the embodiment of the holographic apparatus 10 shown in FIGS. 1 and 1a, light from the hologram layer 12 is diffracted to a viewing location immediately in front of and above the decal 20, which is mounted on the rear quarter window 27 by the rear passenger door.

Alternatively, the hologram layer 12 may be designed to diffract light to an off-perpendicular viewing location such as in a second embodiment of the present invention illustrated with reference to FIGS. 2a and 3, and which corresponds to the location of an observer standing in front of the driver's door.

In a second embodiment described with reference to FIG. 2, the holographic decal 20 comprises a protective plastic layer 11, and a diffuse transmission hologram layer 12 secured to the protective plastic layer 11 byway of an adhesive layer 13. In practice, the holographic apparatus 10 is secured to the interior surface 26 of the window 27 by means of the adhesive layer 16. This second embodiment does not use the two dimensional mask layer 15. The image viewed by the observer is created by the hologram layer 12. The image is created when light 17 from the light source 18 illuminates the rear side of the hologram decal 20.

In the second embodiment, the image can either be two dimensional or three dimensional. Furthermore, light from the image can diffract forward and upward, as is illustrated in FIG. 1, or it can diffract off to the side as is shown in FIG. 3. In practice, it is most useful to have a three-dimensional image instead of a two-dimensional image when the image must be viewed from the side because the three-dimensional image can be turned so that it faces the viewer as in FIGS. 2a and 3, whereas the two-dimensional image is severely foreshortened and is therefore less visible. Thus, the embodiment shown in FIGS. 2a and 3 illustrates the situation in which the three-dimensional hologram image 25 is optimally used. The hologram image 25 is stored in the hologram layer 12 of the decal 20. As is shown in the example of FIGS. 1a and 3, the image is bisected by the surface of the decal 20.

Furthermore, the holographic image of the first and second embodiments may be overlapped (in one or more hologram layers 12) so that the image is viewable simultaneously from multiple viewing locations. For example, one holographic image may be constructed so that it is viewed from straight on, and a second so that it is viewed from the side, as is shown in FIG. 4. Preferably, both images are three dimensional, but two-dimensional images may be used, if desired. For example, the embodiment of FIG. 1, as well as its overlapped combination, has been built and tested and functions satisfactorily. The two images may be incorporated into one hologram layer 12, or into two hologram layers 12 or hologram decals 20, 20a as is shown in FIG. 4. In FIG. 4, the hologram image 25 is stored in the hologram decal 20 whereas the hologram image 25a is stored in the hologram decal 20a.

In the embodiment shown in FIG. 4, it is not possible to incorporate a two-dimensional clear and opaque mask layer 14 for daylight viewability of the icon (as was done in the embodiment shown in FIG. 1) because this would block a portion of the three-dimensional image, particularly the tilted off-axis three-dimensional image shown in FIG. 4. Daylight viewability is achieved through the use of a reflection image hologram layer 12, as is shown in FIG. 6. This reflection image hologram layer 12, when illuminated by an appropriate exterior light source 34, such as the sun, for example, creates a two-dimensional or three-dimensional image viewable from a defined viewing location. The same two-dimensional or three-dimensional image may be created by the transmissive-type hologram described in the first and second embodiments and illustrated in FIG. 5. Therefore the two hologram layers 12 may be overlapped to create a decal 20 that is viewable under both daytime and nighttime lighting conditions as shown in FIG. 7.

Figure 5:
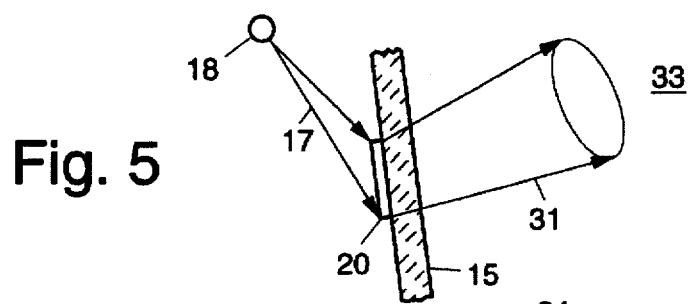
FIGS. 5–7 show side views of the present holographic apparatus and three different illumination methods for use therewith.
Figure 6:
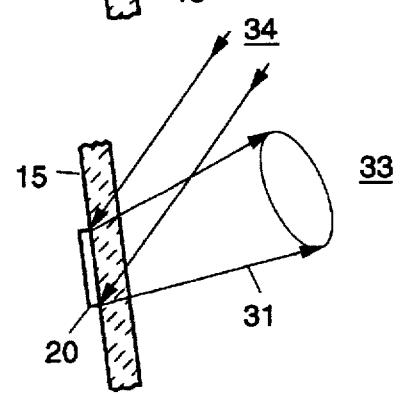
Figure 7:
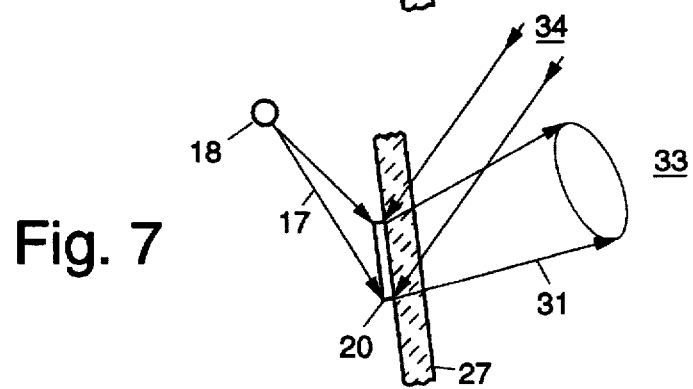

FIGS. 5–7 show side views of the holographic apparatus 10 illustrating three different illumination methods for use therewith. The embodiment of FIG. 5 is generally similar to the embodiment shown in FIG. 1 wherein the light source 18 is disposed inside of the vehicle 30 and illuminates the decal 20 to project the two-dimensional image 24 or the three-dimensional image 25 outside the vehicle 30. In the embodiment of FIG. 6, the decal 20 employs a reflection hologram layer 12 instead of the transmission hologram layer 12 and the icon image 24, 25 thereof is viewable when illuminated using light 34 such as from the sun or an exterior light. The embodiment of FIG. 7 uses a transmission hologram layer 12 in combination with a reflection hologram layer 12 so that the icon image 25 is viewable outside the vehicle 30 when illuminated from inside the vehicle 30 by the light source 18 or from outside the vehicle 30 when illuminated by the exterior light source 34.

The decal 20 may be illuminated from the interior of the vehicle 30 using a light source 18 comprising the light emitting diodes, incandescent bulbs, fiber optic lights, laser diodes, and the like, allowing the icon image 24, 25 to be visible during nighttime conditions. The icon image 24, 25 is viewable during the daytime using an exterior ambient source 34 such as the sun or sky. Thus, the holographic image generation system 10 or holographic apparatus 10 as described herein is viewable by day as an externally illuminated holographic image, and at night the holographic image is generated using a light source 18 disposed interior to the vehicle 30.

Figure 8A:
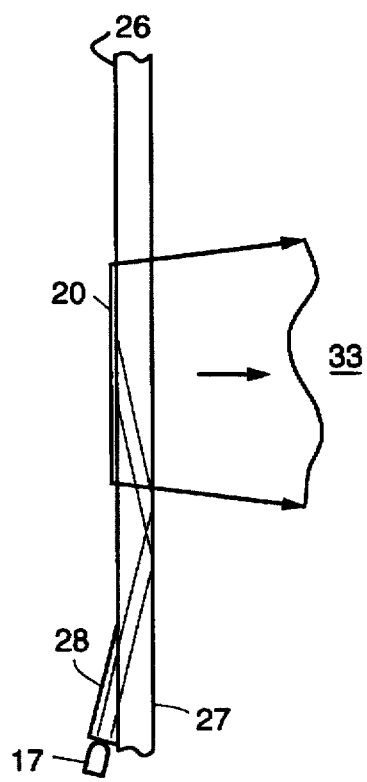
FIGS. 8a and 8b show edge and plan views of another embodiment of the holographic apparatus disposed on a window of a vehicle.
Figure 8B:
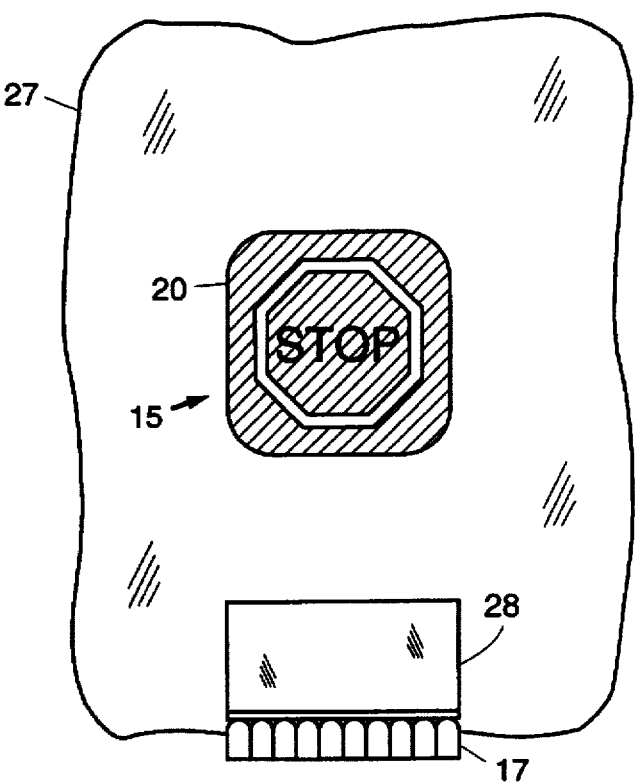

FIGS. 8a and 8b show edge and plan views, respectively, of another embodiment of the holographic apparatus 10 disposed on a window 26 of the vehicle 30. The decal 20 is disposed on the surface 26 of the window 27 in a manner described above. However, in order to illuminate the decal at night, a wedge 28 is adhered to the interior surface 26 of the window 27, and a plurality of diodes 17 are used to inject light through the wedge and into the window 27 so that light is internally reflected within the window 27 and diffracts from the decal 20 to form the image that is viewable by an observer.

Figure 9:
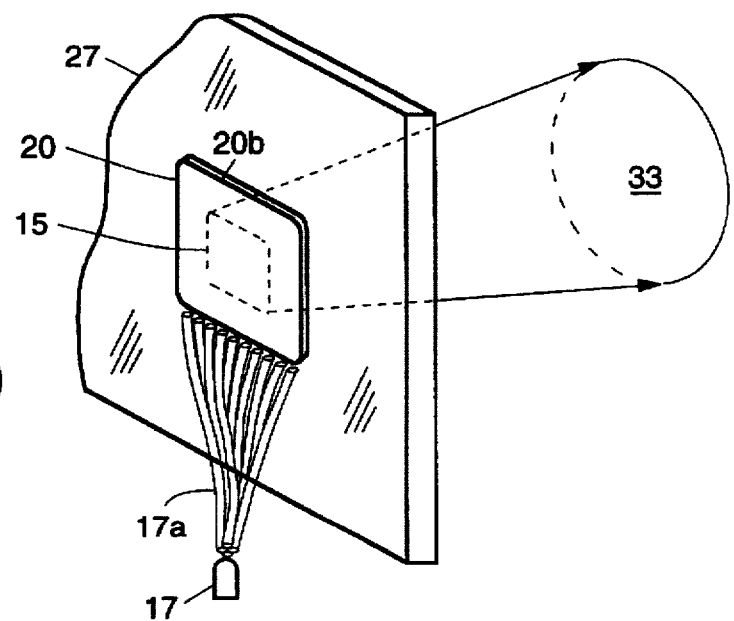
FIG. 9 shows a perspective view of yet another embodiment of holographic apparatus disposed on a window of a vehicle.

FIG. 9 shows a perspective view of yet another embodiment of holographic apparatus 10 disposed on a window 27 of the vehicle 30. In the holographic apparatus 10 of FIG. 9, light emitted from a single laser diode 18, light emitting diode (LED) 18, or incandescent bulb 18, is injected into a bundle of optical fibers 17a placed in close proximity to the light source. The plurality of optical fibers 17a fan out from a circular bundle at the light source 18 to a linear array at the input to the hologram decal 20. The optical fibers 17a are bonded to an edge 20b of the decal 20 with optical adhesive such that they inject light into the edge 20a of the decal 20. The light propagates within the decal 20 and impinges upon the holographic icon 15 and is reflected therefrom to form the viewable image.

Injecting light into the decal 20 via the window 27 or the optical fibers 17a has several advantages over the embodiment of FIG. 1. The arrangement avoids projecting light through the interior airspace of the vehicle 30 onto the decal 20. Furthermore, it avoids alignment problems of the holographic apparatus 10 created by the large build tolerances typical in most production vehicles 30.

Thus, in view of the above, it can be seen that the present invention may provide for a transmitted image that is either two-dimensional or three-dimensional. A two-dimensional image may be formed by vignetting of the holographic image by the two-dimensional mask layer 14. Either a two-dimensional or a three-dimensional image may be formed using the hologram layer 12 alone. The image may be viewed on axis or off axis. A single image may be viewed from one viewing location or two or more images may be viewed from two or more viewing locations. Multiple images may be incorporated into a single hologram layer 12 or in multiple hologram layers 12.

Furthermore, the present invention may provide for a reflected image that uses the non-holographic two-dimensional mask layer 14, or the three-dimensional hologram layer 12. The images may be viewed on axis or off axis. A single image may be viewed from one viewing location or two or more images may be viewed from two or more viewing locations. Multiple images may be incorporated into a single hologram layer 12 or in multiple hologram layers 12.

Thus, holographic apparatus for displaying information to observers under daytime and nighttime lighting conditions has been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention. For example, the present invention may be used in non-vehicle applications as a sign for use in advertisements, and the like.

What is claimed is:

1. Holographic apparatus for displaying information to an observer, said apparatus comprising:
    a decal comprising:
        a protective layer;
        a hologram comprising a transmission hologram layer secured to the protective layer that contains a holographic image that is projected in a predetermined viewing direction when illuminated; and
        an opaque and clear mask layer into which an icon is incorporated; and a light source for illuminating the transmission hologram layer to project the holographic image to an observer.

2. The apparatus of claim 1 wherein the hologram comprises a transmission hologram layer and a reflection hologram layer.

3. The apparatus of claim 1 wherein the decal further comprises a second transmission hologram layer that is designed to transmit a second holographic image in a second predetermined viewing direction.

4. The apparatus of claim 1 wherein the decal further comprises a reflection hologram layer that is designed to project a second holographic image in a second predetermined viewing direction.

5. The apparatus of claim 1 wherein the light source is disposed within a vehicle at a predetermined angle relative to the hologram.

6. The apparatus of claim 1 wherein the decal is disposed on a surface of a window, and wherein the light source comprises a prism secured to the window, and a light source for projecting light through the prism and into the window, which light is internally reflected by the window onto the transmission hologram layer to project the holographic image.

7. The apparatus of claim 1 wherein the decal is disposed on a surface of a window, and wherein the light source comprises a light emitting diode for providing light and a plurality of optical fibers coupled between the light emitting diode and an edge of the decal for coupling light from the diode to the transmission hologram layer to project the holographic image.

8. Holographic apparatus for displaying information to an observer outside of a vehicle, said apparatus comprising:
    a decal disposed on an interior surface of a window of the vehicle, said decal comprising:
        a protective plastic layer;
        a hologram comprising a transmission hologram layer secured to the protective plastic layer that contains a holographic image that is projected in a predetermined viewing direction when illuminated; and an opaque and clear mask layer into which an icon is incorporated; and a light source for illuminating the transmission hologram layer to project a holographic image outside of the vehicle.

9. The apparatus of claim 8 wherein the decal further comprises a reflection hologram layer that is designed to project a second holographic image in a second predetermined viewing direction.

10. The apparatus of claim 8 wherein the hologram comprises a transmission hologram layer and a reflection hologram layer.

11. The apparatus of claim 8 wherein the decal further comprises a second transmission hologram layer that is designed to transmit a second holographic image in a second predetermined viewing direction.

12. The apparatus of claim 8 wherein the decal further comprises a reflection hologram layer that is designed to transmit a second holographic image in a second predetermined viewing direction.

13. The apparatus of claim 8 wherein the light source is disposed within the vehicle at a predetermined angle relative to the hologram.

14. The apparatus of claim 8 wherein the light source comprises:

a prism secured to the window; and a light source for projecting light through the prism and into the window, which light is internally reflected by the window onto the transmission hologram layer to project the holographic image.

15. The apparatus of claim 8 wherein the light source comprises:

a light source for providing light; and a plurality of optical fibers coupled between the light emitting diode and an edge of the decal for coupling light from the light source to the transmission hologram layer to project the holographic image.

* * * * *